Jan. 1, 1963  M. A. GARBELL  3,070,999
FLUID VELOCITY MEASURING SYSTEM FOR ROTORCRAFT
Filed May 7, 1956  6 Sheets-Sheet 2

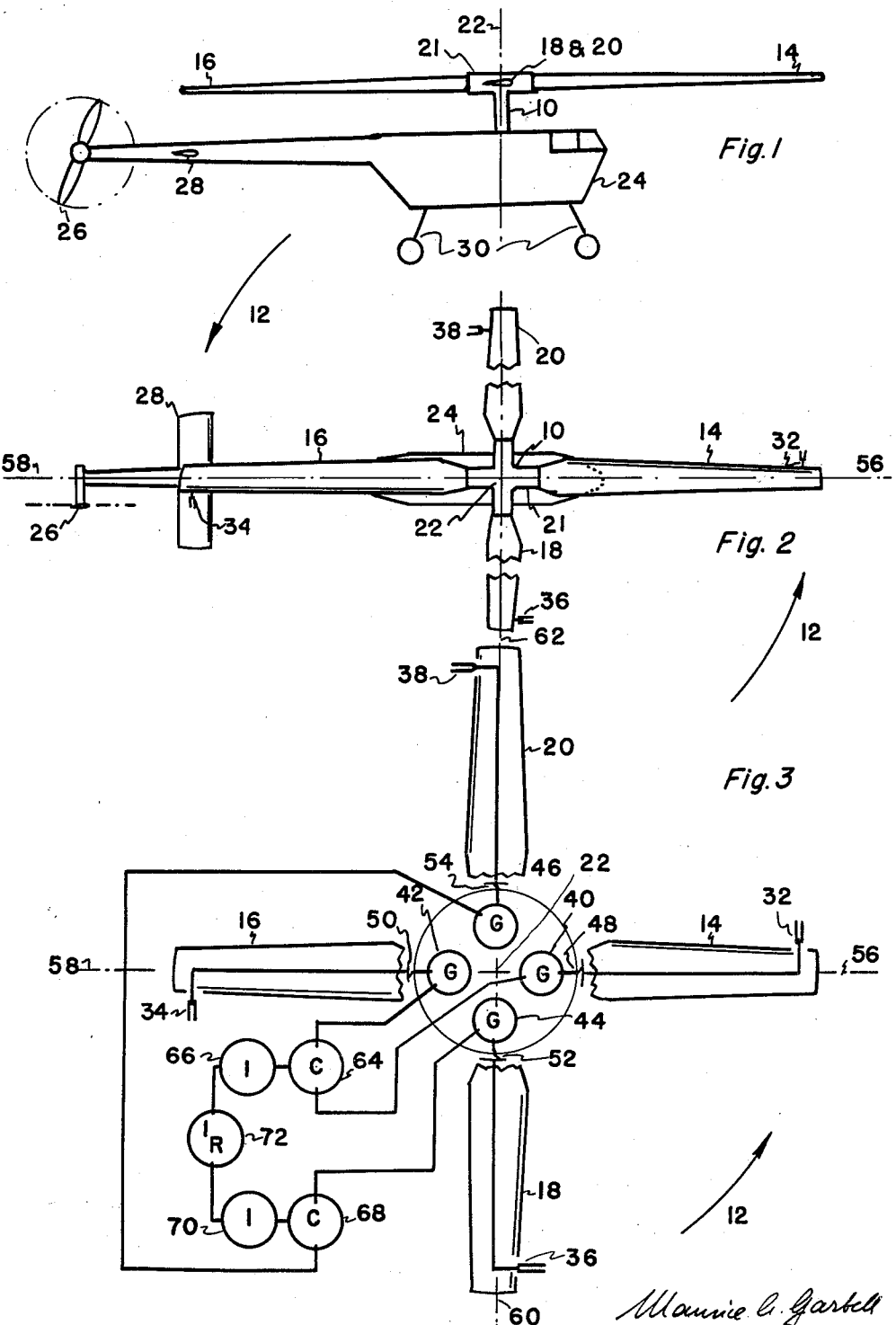

Maurice A. Garbell
Inventor

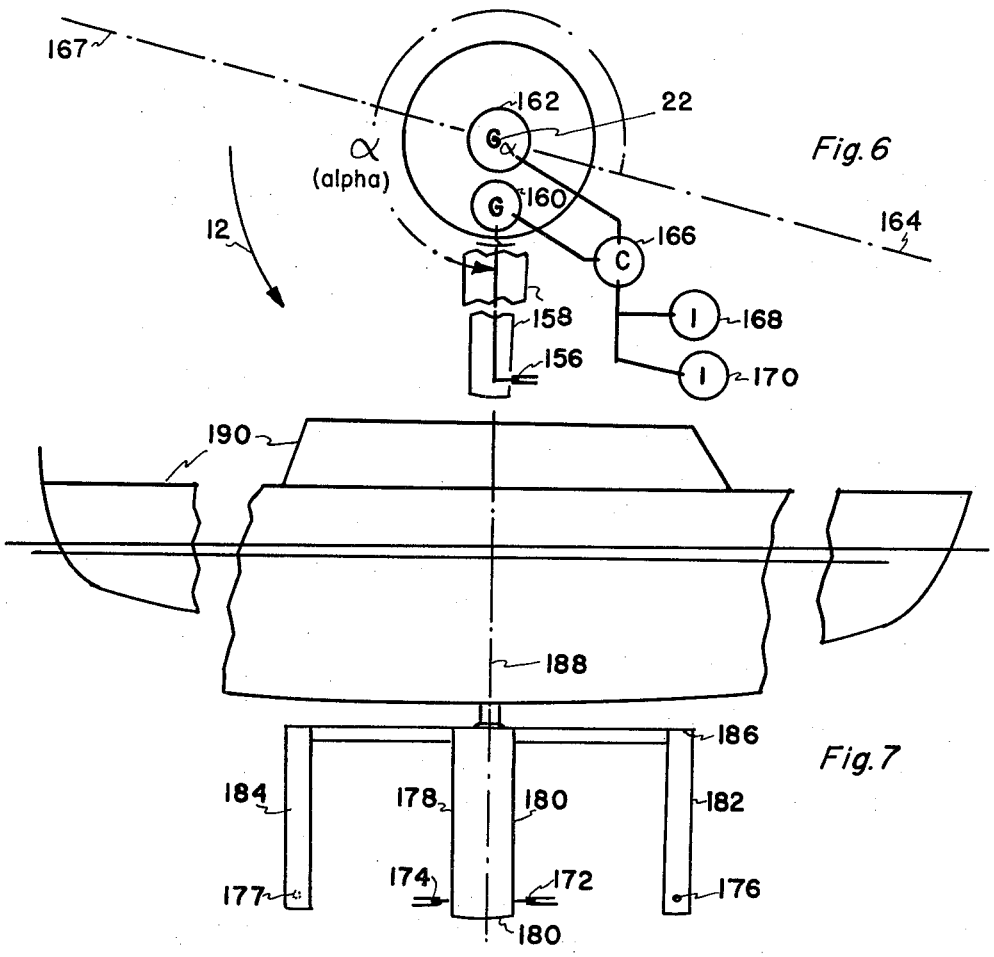

Jan. 1, 1963 M. A. GARBELL 3,070,999
FLUID VELOCITY MEASURING SYSTEM FOR ROTORCRAFT
Filed May 7, 1956 6 Sheets—Sheet 5

Maurice A. Garbell
Inventor

Maurice A. Garbell
Inventor 3,070,999
FLUID VELOCITY MEASURING SYSTEM FOR ROTORCRAFT
Maurice A. Garbell, San Francisco, Calif., assignor of one-half to Garbell Research Foundation, a non-profit corporation of California, and of one-half to Maurice A. Garbell, Inc., a corporation of California
Filed May 7, 1956, Ser. No. 582,999
22 Claims. (Cl. 73—181)

This invention relates to fluid-velocity measuring instrumentation which provides the pilot of a craft operating in a fluid and supported or propelled within said fluid by revolving fluid-foil surfaces with an accurate measurement and indication of the direction and magnitude of the velocity and the displacement of the craft relative to the undisturbed fluid surrounding the craft.

Hereinafter, a craft operating in a fluid and deriving a major portion of its sustentation or propulsion from a system of revolving fluid-foil surfaces will be designated as a "rotorcraft"; a sustaining or propelling force produced through the dynamic action of a fluid upon a fluid-foil surface moving relative to said fluid will be designated as "lift"; a rotating lift-producing mechanism comprising a drive shaft rotating about an axis and a plurality of revolving fluid-foil surfaces and other revolving appurtenances will be designated as a "rotor"; a revolving fluid-foil surface providing part of the lift produced by a rotor, or any other appurtenance revolving about the rotor axis, will be designated as a "rotor blade"; the velocity of a solid body relative to a free undisturbed fluid surrounding the said body will be designated as the "fluid velocity" of said body; the magnitude of a fluid velocity will be designated as a "fluid speed"; the direction of a fluid velocity lying within a plane essentially containing a rotor axis and the major longitudinal dimension or axis of the body of a rotorcraft will be designated as "longitudinal" and will be understood to have a "forward" and a "backward" sense; the direction of a fluid velocity lying in a plane essentially containing a rotor axis and essentially perpendicular to said longitudinal axis of the body of a rotorcraft will be designated as "transverse" and will be understood to have a "rightward" and a "leftward" sense; any liquid fluid will be designated as "water"; any gaseous fluid wil be designated as "air"; a device exposed to a fluid flow and capable of providing a signal representing the magnitude of the fluid speed of said fluid flow by means of a pressure, an electrical force or current, or other mechanical or physical means well known in the art, will be designated as a "sensor"; a device capable of making a transmission line carrying a signal operative or inoperative will be designated as a "contactor"; a device capable of measuring a signal representative of the measured fluid velocity provided by a sensor and capable of measuring said signal in terms of the relative fluid speed impinging on the sensor and capable of measuring the angular position of a rotor blade relative to the body of the rotorcraft, will be designated as a "gauge"; a device capable of making algebraic sums and multiplications of numerical quantities will be designated as a "computer"; a computer capable of summing up values of one variable over a specified numerical range of values of another variable will be designated as an "integrator"; a device capable of providing a signal or a direct visual reading, multiplied by a predesignated numerical constant, of measured, computed, or integrated values of the relative fluid velocity of the rotorcraft to the pilot, or of providing a signal or reading to the pilot relative to the displacement of the rotorcraft relative to the surrounding undisturbed fluid or relative to the underlying ground surface, will be designated as an "indicator"; a human person or an automatic device or the combination of a human person with an automatic device capable of coordinated operation and maneuvering of a rotorcraft and of its various fluid-dynamic and powerplant control devices will be designated as a "pilot"; it will be expressly understood that, wherever the term "algebraic sum of fluid velocities" is used, that term designates an algebraic sum, that is an addition or subtraction, depending on the mathematical signs of the fluid velocities involved, of quantities linearly proportional to the fluid velocities themselves; therefore, when an algebraic sum of a positive fluid velocity $v_1 = U+v$ and a negative fluid velocity $v_2 = -(U-v)$ will hereinafter be made, the algebraic sum $$v_1 + v_2 \text{ will equal } U+v-(U-v)=2v$$

this operation is expressly distinguished from that termed by some "difference of relative wind velocities" obtained by subtracting dynamic pressures or other quantities proportional to the square of the fluid velocities, namely, proportional to $$(U+v)^2 - (U-v)^2 = 4Uv$$

the latter reasoning and the devices essentially based thereon do not yield a result proportional to the algebraic sum of the fluid velocities measured, but yield a result proportional to the product of the said algebraic sum of the fluid velocities times the extraneous velocity U. Since it will be found that the velocity U, which in the present instance is proportional to the angular speed of the rotor, not only is not of interest to the pilot of a rotorcraft in relation to the accurate measurement of the fluid velocity of the rotorcraft, but is variable within relatively ample limits, it is clearly apparent that devices employing and essentially depending on differences of quantities proportional to the square of fluid velocities are not suitable for the measurement of a velocity $v$ independent of an extraneous velocity U. It will be readily understood that in the present specification and claims reference is had solely to the employment of physical quantities proportional to the fluid velocity of the rotorcraft, $v$, alone, which is completely distinct from combinations and mechanisms employing physical quantities proportional to both the fluid velocity of the rotorcraft and other extraneous velocities, U.

The principal object of this invention is to provide an accurate measurement and indication of the fluid velocity of a rotorcraft to the pilot of said craft during slow-speed maneuvers, such as in an aerial rotorcraft during take-off steep ascent, nearly motionless hovering, slow-speed flight, steep descent, and landing, or in a rotorcraft partly or wholly immersed in water, during slow-speed navigation and combined longitudinal and transverse maneuvers.

A further object is to provide the pilot of a rotorcraft with an accurate and continual measurement and indication of the fluid velocity longitudinally forward and backward, and also transversely rightward and leftward.

A further object is to provide the pilot of a rotorcraft with a measurement and indication of the fluid velocity of the rotorcraft independent of the angular rotary velocity of the rotor.

A further object is to make a measurement of the longitudinal and transverse components of the fluid velocity of a rotorcraft virtually independent of any pitching, yawing, or rolling motions of the rotorcraft.

A further object is to make a measurement of the longitudinal and transverse components of the fluid velocity of a rotorcraft virtually independent of the severely disturbed and complex fluid-flow conditions prevailing over most of the body or fuselage of a rotorcraft created by the intense and widely varying fluid flow emanating from the principal lift-producing rotor and other fluid flows created by auxiliary rotors, stationary and moving fluid foils, propellers, jets, engine exhausts, and other fluid-dynamic and powerplant devices that are part of a rotorcraft.

A further object is to make a measurement of the longitudinal and transverse components of a fluid velocity in a rotorcraft virtually independent of variations in the fluid flow impinging on the body of the rotorcraft as a result of the motions of the rotorcraft in and out of the immediate vicinity of a ground or water surface, where the fluid flow emanating from the main lifting rotor and other appurtenances is severely deflected by the action of said ground or water surface, and also as a result of sudden changes in the power supplied to the main lift-producing rotor which create short-lived but intense flow eddies around the craft.

The above stated and other objects and novel features of the invention will appear more fully hereinafter from the following detailed description when taken in connection with the accompanying drawings which illustrate several forms of the invention. It is expressly understood, however, that the drawings are utilized for purposes of illustration only and are not designed as a definition of the limits of the invention, reference being had for this latter purpose to the appended claims.

In the drawings, wherein similar reference characters refer to similar parts throughout the several views:

FIG. 1 is a schematic side view of a helicopter-type aerial rotorcraft wherein an air-velocity measuring instrumentation system constructed in accordance with the present invention is installed, and FIG. 2 is a schematic plan view of said aerial rotorcraft equipped with the same instrumentation system, and FIGS. 3, 4, 5, 6, 7, and 8 are schematic views of modified forms of the invention applicable to aerial and waterborne rotorcraft.

Figure 4:
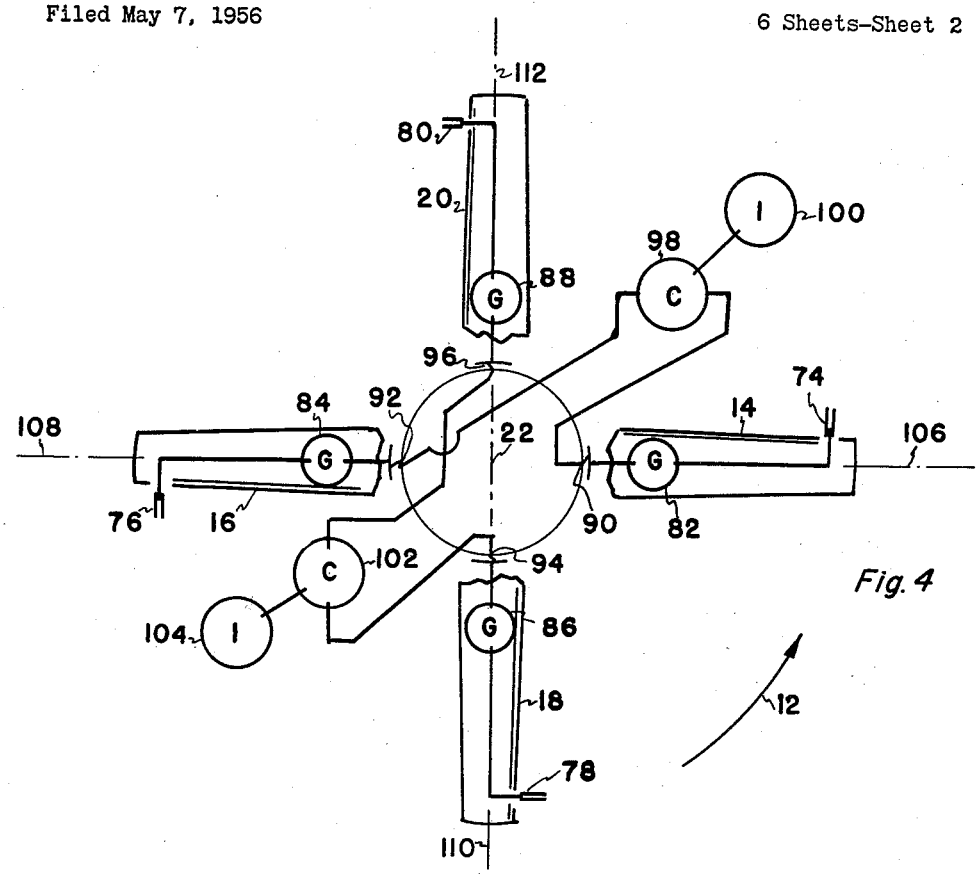

In all drawings, gauges are represented by boxes inscribed with a letter "G"; computers, including integrators, are represented by boxes inscribed with a letter "C"; and indicators are represented by boxes inscribed with a letter "I."

Referring more particularly to FIGS. 1 and 2, the air-velocity measuring instrumentation of the present invention is therein illustrated in connection with a helicopter-type aerial rotorcraft having a rotor generally designated 10 equipped with a plurality of rotor blades 14, 16, 18, and 20 attached to a rotor hub 21, said rotor and rotor hub rotating in a sense indicated by arrow 12 about an essentially vertical rotational axis 22 mounted on a body or fuselage 24 which is also fitted with other devices and appurtenances, such as a directional control rotor 26 and fixed or adjustable airfoil surfaces 28 and a landing gear 30. The invention is applicable to rotorcraft having a rotor equipped with any number of rotor blades and a rotor rotating about a vertical, horizontal, or otherwise inclined rotational axis, as will be clearly understood from the following.

Relative to the problem of providing the pilot of a rotorcraft with an accurate measurement and indication of the fluid velocity of said craft during slow-speed maneuvers, the essence of the invention is to provide the desired measurement of the fluid speed of the aircraft in a given direction, that is, in a direction perpendicular to a given reference plane, by means of fluid-speed sensors mounted on the revolving rotor blades at some distance apart from the rotor axis, and more preferably in the vicinity of the outer tips of said rotor blades, and a combination of fluid-speed gauges, computers, and indicators which provide an indication of the algebraic sum of the fluid speeds of rotor-blade mounted sensors moving in the two opposite senses of said given direction, and thereby to overcome the heretofore difficult problem of measuring the direction and speed of extremely slow fluid speeds by measuring two greater fluid speeds that can be measured more readily and more accurately and by computing and indicating the algebraic sum thereof.

Relative to the problem of providing the pilot of a rotorcraft with an accurate and continual measurement and indication of the fluid velocity of the rotorcraft forward and backward as well as to the right and left, the essence of the invention is to provide, by placing fluid-speed sensors on the rotor blades which revolve through the full 360-degree rotor horizon, a measurement and indication or signal of any combination of longitudinal and transverse fluid velocities occurring through the entire 360 degrees of the rotorcraft horizon and without discontinuity of indication.

Relative to the problem of rendering the measurement of the fluid velocity of a rotorcraft virtually independent of the angular rotary velocity of the rotor, the essence of the invention is to eliminate the mathematical rotor-speed term, which would appear in any system employing the dynamic pressure difference or any other difference of quantities proportional to the square of the velocities between the advancing and retreating rotor blades, through the employment of gauges responsive to quantities linearly proportional to said velocities as sensed by a sensor placed on a rotor blade moving in one sense of the given direction and by a sensor placed on a rotor blade moving in the opposite sense of the given direction, and through the employment of computers capable of algebraic summation of the output signals of said gauges wherein the rotor-speed terms, being equal and of opposite sign, reduce each other to zero and drop out.

Relative to the problem of rendering the measurement of the fluid velocity of a rotorcraft virtually independent of any pitching, yawing, and rolling motions of the rotorcraft, the essence of the invention is to place fluid-speed sensors on the rotor blades, the axis of revolution of which passes essentially through the center of gravity of the rotorcraft, and to measure the fluid-speed signals of said sensors at such points of their revolutions about the rotor axis that the pitching, yawing, and rolling motions do not impose any distorting effects on the fluid-velocity measurements obtained therefrom.

Relative to the problem of rendering the measurement of the fluid velocity of a rotorcraft virtually independent of the severely disturbed and complex fluid-flow conditions prevailing over most of the body of a rotorcraft, the essence of the invention is to place fluid-speed sensors on the rotor blades where the direction and speed of the fluid flow are free of disturbances in the direction of measurement or where measurements can be made at diametrally opposite points of the circular path of a rotor blade, whereby the net effect of any disturbance is rendered negligibly small, since in the algebraic summation of the fluid-speed measurements taken in the diametrally opposite points and performed by the computer the disturbance introduces two equal quantities of opposite sign which nullify each other.

Relative to the problem of rendering the measurement of the fluid velocity of a rotorcraft virtually independent of the complex variations in the fluid flow impinging on the body of a rotorcraft during motions of the craft in and out of the immediate vicinity of a ground or water surface, and during sudden changes in the power supplied to the main lift-producing rotor, the essence of the invention is to place fluid-speed sensors in certain locations on the rotorcraft where said variations are relatively small, namely, on the rotor blades.

This is achieved in the configuration shown in FIGS. 1, 2, and 3 by providing an airspeed sensor 32, 34, 36, and 38, on each of rotor blades 14, 16, 18, and 20, respectively, and airspeed gauges 40, 42, 44, and 46 mounted on the body or fuselage 24. It is understood that, in an airspeed measuring instrumentation system constructed in accordance with the invention, the airspeed sensors 14, 16, 18, and 20 and the airspeed gauges 40, 42, 44, and 46 may employ any suitable principle of airspeed sensing and measurement, for example the sensing and measurement of the total aerodynamic pressure in a Pitot-type or Venturi-type tube, the thermo-electric effects utilized in "hot-wire" or bimetallic probes, or any other type of airspeed sensing probe known in the art, and that the airspeed signal issuing from the sensor be transmitted to an airspeed gauge by means of a pressure conduit, electric wire, or any other means peculiar to the type of airspeed sensor employed, and that the airspeed signal issuing from the gauges be linearly proportional to the airspeed measured as can be accomplished by means described hereinafter. Positioned at equal right angles about the axis of the main rotor shaft are four contact switches or contactors, 48 and 50 on the longitudinal vertical plane of symmetry of the body 24 and contactors 52 and 54 on the transverse vertical plane perpendicular thereto, in each of which, for example 48, contact is established to make a transmission line operative for the transmission of an airspeed signal from an airspeed sensor, for example 32, to an airspeed gauge, for example 40, where such contact is understood to comprise either a physical coupling, a direct electrical contact, or an indirect contact for transmission of a signal, such as through electrical induction currents, a controlled beam of light, or other means of transmission of signals peculiar to the type of airspeed sensor and gauge employed, as described hereinafter. Thus it will be understood that, when the rotor blade 14 in its essentially horizontal rotational path passes through a vertical plane 56—58, which contains the rotational axis 22 of the rotor and the major longitudinal dimension or axis of the body 24 and hence essentially coincides with the vertical plane of symmetry of the rotorcraft, that is, when the velocity of the blade-mounted sensor is essentially directed toward the left of said plane 56—58 considering the sense of rotation 12 of the rotor 10, the establishment of an operative contact in contactor 48 between sensor 32 and gauge 40 will enable said gauge to obtain briefly a measurement of the leftwardly directed air velocity of sensor 32, the sense of which, for example, may be designated with the mathematical sign "minus." Simultaneously, contactor 50 would establish an operative contact between airspeed sensor 34 and gauge 42, both of which are diametrally opposite to sensor 32 and gauge 40 with reference to rotor axis 22, and said gauge 42 would obtain briefly a measurement of the rightwardly directed air velocity of sensor 34, the sense of which may be designated with the mathematical sign "plus." Simultaneously, contactor 52 would connect airspeed sensor 36 with gauge 44 when rotor blade 18 transits through the transverse vertical plane 60—62, thereby enabling gauge 44 to obtain briefly a measurement of the forwardly directed longitudinal air velocity of blade-mounted sensor 36, the sense of which may be designated with the mathematical sign "plus." Simultaneously, contactor 54 would connect airspeed sensor 38 with gauge 46 when rotor blade 20 transits through the transverse planes 60—62, thereby enabling gauge 46 to obtain a measurement of the backwardly directed longitudinal air velocity of the blade-mounted sensor 38, the sense of which may be designated with the mathematical sign "minus." Completing the structure of the present invention, a computer 64, capable of performing a numerical addition and subtraction and connected to gauges 40 and 42 by means well known in the art so that it receives the output signals from said gauges in a form suitable for computation, computes the algebraic sum of the airspeed signals of gauges 40 and 42 and indicates one-half of the numerical result on an indicator 66 by means of a hand on a dial, digit indicators on a counter, or suitable electrical output signals transmitted to a pictorial display, where it will represent the transverse right-and-left velocity of the rotorcraft with an indication of both the speed and the plus-or-minus sense of the velocity. Similarly, a computer 68 is connected to gauges 44 and 46 and computes the algebraic sum of the output signals of said gauges 44 and 46 and indicates one-half of the numerical result on an indicator 70, where it will represent the longitudinal fore-and-aft air velocity of the rotorcraft, with an indication of both the speed and the plus-or-minus sense of the velocity.

Figure 9:
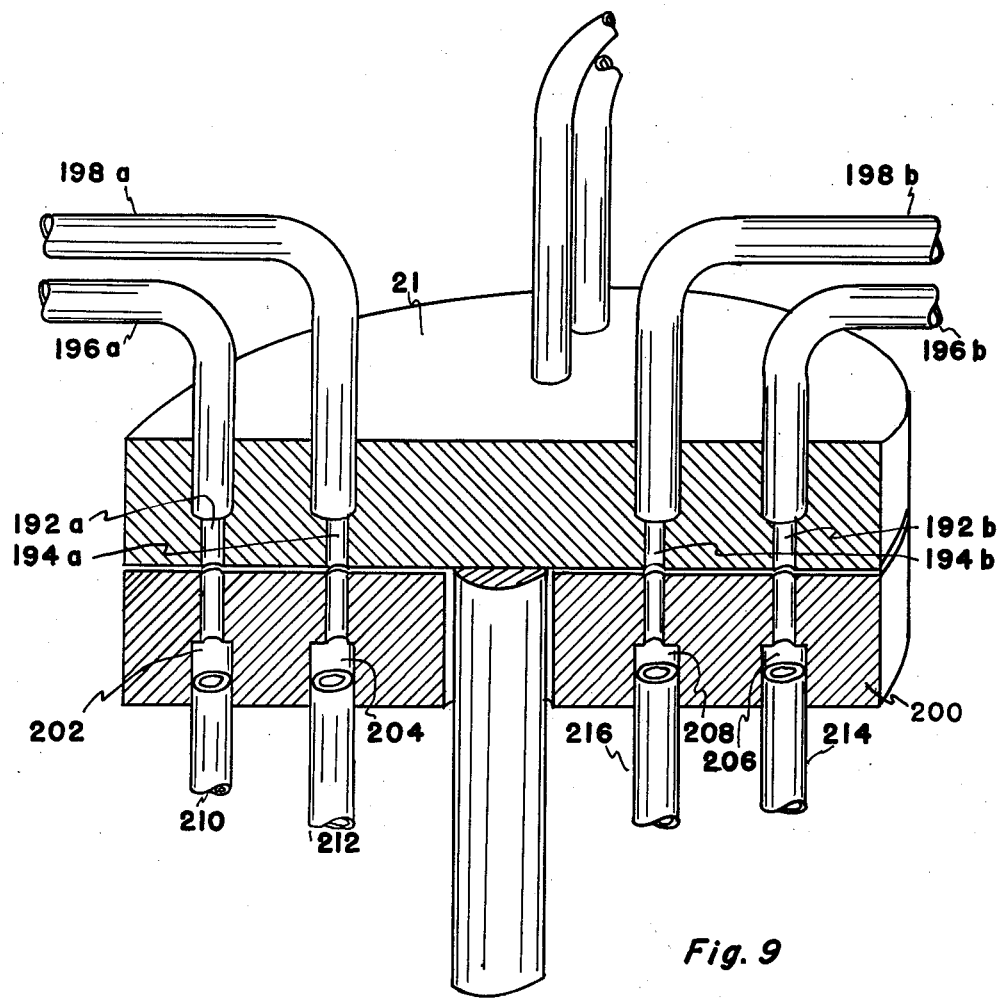
FIG. 9 is a schematic view of a rotor-hub arrangement containing a pressure-tube contactor system constructed according to a preferred embodiment of the invention.
Figure 10:
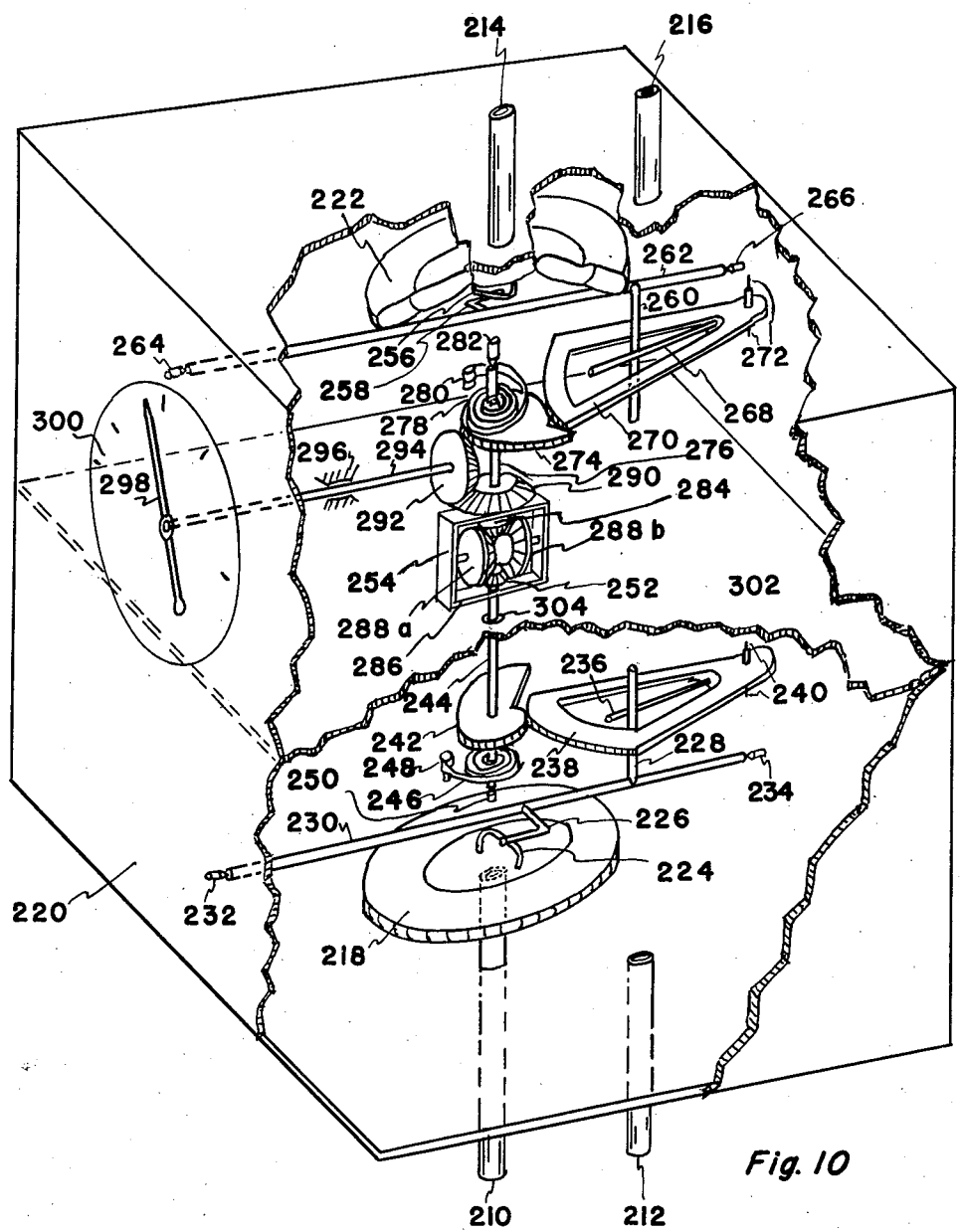
FIG. 10 is a schematic view of an instrument casing containing diaphragms, arms, gears, pivots, and a pointer moving over a dial, all of which provides speed readings according to a preferred embodiment of the invention.

Turning to a more specific description of structures employed by the present invention, one preferred embodiment of the invention employs a configuration shown in FIGS. 3, 9, and 10, wherein Pitot-Static tubes, well known in the art, are employed as airspeed sensors 32, 34, 36, and 38, pressure conduits of conventional construction carry the total-head pressures and the static pressures sampled by the sensors to the rotor hub 21, which rotates about axis 22. Hub 21, as shown in FIG. 9, contains a plurality of bores 192 and 194, where bore 192 is connected with the total-head probe of a sensor, for example, 36, by means of a tube 196, whereas bore 194 is connected with the static-pressure probe of the same sensor by means of a tube 198. It should be noticed that for each rotor blade 14, 16, 18, 20, that carries a sensor 32, 34, 36, 38 mounted thereupon, there is a pair of tubes 196 and 198 and a pair of bores 192 and 194. In the drawings, a letter, such as $a$, $b$, etc., is affixed to each number 192, 194, 196, 198 to signify the pertinence of a set of bores and tubes to a given rotor blade and sensor.

Directly adjacent to hub 21 is a stator 200 which is rigidly affixed to fuselage 24. Stator 200 contains two pairs of bores, 202, 204, and 206, 208, each pair of bores being placed away from rotational axis 22 and diametrally opposed to the other pair in a plane which contains the rotary axis 22 and is perpendicular to the direction in which the desired air velocity component is to be measured. For example, if the fore-and-aft velocity is to be measured, the pairs of bores 202, 204 and 206, 208 will be disposed on stator 200 in the transverse vertical plane 60—62. Each of the bores 202, 204, 206, and 208 is connected correspondingly with tubes 210, 212, 214, and 216. Tube 210, issuing from bore 202, terminates inside diaphragm 218 which is located within an airtight box or casing 220; similarly, tube 212, issuing from bore 204, terminates inside casing 220 but outside diaphragm 218. Similarly, tube 214, issuing from bore 206, terminates inside diaphragm 222 within casing 220, and tube 216, issuing from bore 208, terminates inside casing 220 but outside diaphragm 222.

It is clearly apparent that bores 192$a$ and 194$a$ will communicate intermittently with bores 202 and 204, and bores 192$b$ and 194$b$ will communicate intermittently with bores 206 and 208, respectively, only when the rotor blade bearing tubes 196$a$ and 198$a$ and the rotor blade bearing tubes 196$b$ and 198$b$ pass through the reference plane, for example, plane 60—62, which is perpendicular to the direction in which the air velocity component is to be measured. At such a time a dynamic pressure proportional to the square of the airspeed locally prevailing at sensor 36 is introduced through tube 210 into the interior of diaphragm 218, while the static pressure prevailing at the same instant at sensor 36 is introduced through tube 212 inside casing 220 and outside diaphragm 218. Diaphragm 218 will then expand proportionately to the excess of the dynamic or total-head pressure over the static pressure, thereby raising bracket 224, rigidly affixed to the top surface of diaphragm 218, and causing arms 226 and 228 to pivot counterclockwise—as seen from the left—together with shaft 230 to which both arms are rigidly affixed, about bearings 232 and 234 which are fixed within casing 220. Said pivoting of arm 228 will displace the top of the arm toward the rear of the instrument and will carry with it arm 236 against which it bears. Arm 236 is rigidly connected with gear sector 238 which pivots about bearing 240 rigidly mounted within casing 220. Gear sector 238 is in mesh with gear sector 242 fixedly mounted on shaft 244, at the lower end of which the inside end of anti-backlash spiral spring 246 is attached. The outside end of said spring is anchored to bracket 248 which is rigidly attached to casing 220. The lower end of shaft 244 pivots within bearing 250 which is fixed within casing 220. It is noticed that gear sectors 238 and 242 are not necessarily circular but have conjugate radii, that is, the radii corresponding to a given point of mutual contact between the two gear sectors, essentially porportional to a square-root function of the angular displacement from zero of gear sector 238. Hence, while the angular displacement of arm 236 and gear sector 238 about pivot 240 is essentially proportional to the excess of the dynamic pressure over the static pressure at sensor 36, and, hence, proportional to the square of the airspeed measured by sensor 36, the angular displacement of shaft 244 about pivot 250 will be linearly proportional to that airspeed.

Also affixed to shaft 244 and, therefore, pivoting with gear sector 242 is bevel gear 252 which is a primary driving gear in a differential generally designated 254.

It is also understood that when a rotor blade transits through the same reference plane 60—62 but in a sense opposite to that of rotor blade 18 just discussed, a dynamic pressure proportional to the square of the airspeed at sensor 38 and carried by tube 196b will be communicated through bore 192b in hub 21 and bore 206 in stator 200, which bores at that time are temporarily aligned with one another, and from bore 206 through tube 214 to the inside of diaphragm 222 in casing 220, while the static pressure prevailing at the same instant at sensor 38 is introduced through tube 198b, bores 194b and 208, and tube 216 inside box 220 and outside diaphragm 222. Diaphragm 222 will then expand proportionately to the excess of the dynamic pressure over the static pressure, thereby moving downward bracket 256 rigidly affixed to the movable bottom surface of diaphragm 222 and causing arms 258 and 260 to pivot counterclockwise—as seen from the left—together with shaft 262 to which both arms are rigidly affixed, about bearings 264 and 266 which are fixed within casing 220. Such pivoting will displace the bottof end of arm 260 toward the front of the instrument and will carry with it arm 268 against which it bears. Arm 268 is rigidly connected with gear sector 270, all of which pivot jointly about bearing 272 which is rigidly mounted inside casing 220. Gear sector 270 is in mesh with gear sector 274 fixedly mounted on shaft 276, at the top of which the inside end of backlash-preventing spiral spring 278 is attached. The outside end of said spring is anchored to bracket 280 which is rigidly attached to casing 220. The upper end of shaft 276 pivots in bearing 282 which is fixed within casing 220 and, it is readily noticed, is aligned with bearing 250. It will be understood that gear sectors 270 and 274 are not necessarily circular but have conjugate radii, that is, the radii corresponding to given point of mutual contact between the two gear sectors, substantially proportional to a square-root function of the angular displacement from zero of gear sector 270. Hence, while the angular displacement of arm 268 about pivot 272 is essentially proportional to the excess of the dynamic pressure over the static pressure at sensor 38 and, hence, proportional to the square of the airspeed measured by sensor 38, the angular displacement of shaft 276 about pivot 282 will be linearly proportional to that airspeed.

Also affixed to shaft 276 and therefore pivoting with gear sector 274 is bevel gear 284 which is a primary drive gear in differential 254.

It will be readily understod that, under the influence of the dynamic pressures prevailing in diaphragms 218 and 222, respectively, the aforedescribed arms and gear sectors will cause a counterclockwise pivoting—as seen from above—of shaft 244 and bevel gear 252, and a clockwise pivoting—as seen from above—of shaft 276 and bevel gear 284. It follows that differential cage 286, impelled by satellite bevel gears 288a and 288b, which are in mesh with bevel gears 252 and 284, will revolve about the common axis of bearings 250 and 282 at a rate which is the algebraic sum of the angular displacements of shafts 244 and 276 and, hence, proportional to the algebraic sums of the air velocities measured by sensors 36 and 38.

Fixedly attached to the differential cage 286 is a bevel gear 290, to which is meshed a bevel gear 292 fixed on shaft 294 which pivots on bearing 296 fixed in casing 220. Fixed onto shaft 294 is also a pointer 298 which moves over a dial 300 and which dial is graduated in units of airspeed, forward in the clockwise and backward in the counterclockwise sense.

It will be noticed that, whereas the static pressures conveyed by tubes 212 and 216 ideally should equal one another, some slight difference between them may occur because of the different aerodynamic fields surrounding sensors 36 and 38 and for other well-known causes. Provision is therefore made for a rigid wall 302 to be placed across the interior of casing 220 through which shaft 244 passes at a pressure-tight fitting 304, in order that each half of casing 220 retain its respective static pressure.

From the foregoing it will be understood that the essential elements of the invention, in the hereindescribed preferred embodiment of the invention, are constituted as follows: Pitot-static probes constitute "sensors" such as 36 and 38; the combination of diaphragm 218 and the mechanism consisting of bracket 224, arms 226 and 228 and 236, gear sectors 238 and 242, shaft 244, and spring 246 constitute one "gauge" such as 44; the combination of diaphragm 222 and the mechanism consisting of bracket 256, arms 258 and 260 and 268, gear sectors 270 and 274, shaft 276, and spring 278, constitute a second "gauge," such as 46; rotor hub 21 and fixed stator 220, together with their respective bores and tubes connected thereto, constitute "contactors" which provide the desired intermittent transmission of an airspeed signal from sensors 36 and 38 to gauges 44 and 46 whenever rotor blades 18 and 20 carrying sensors 36 and 38 pass through plane 60—62 perpendicular to which the air velocity component is to be measured; the differential 254 constitutes the "computer" which mechanically determines the algebraic sum of the airspeed indications of the two "gauges"; bevel gear 292, shaft 294, pointer 298, and dial 300 constitute an "indicator" which provides a reading of the resultant air velocity component perpendicular to plane 60—62.

Figure 11:
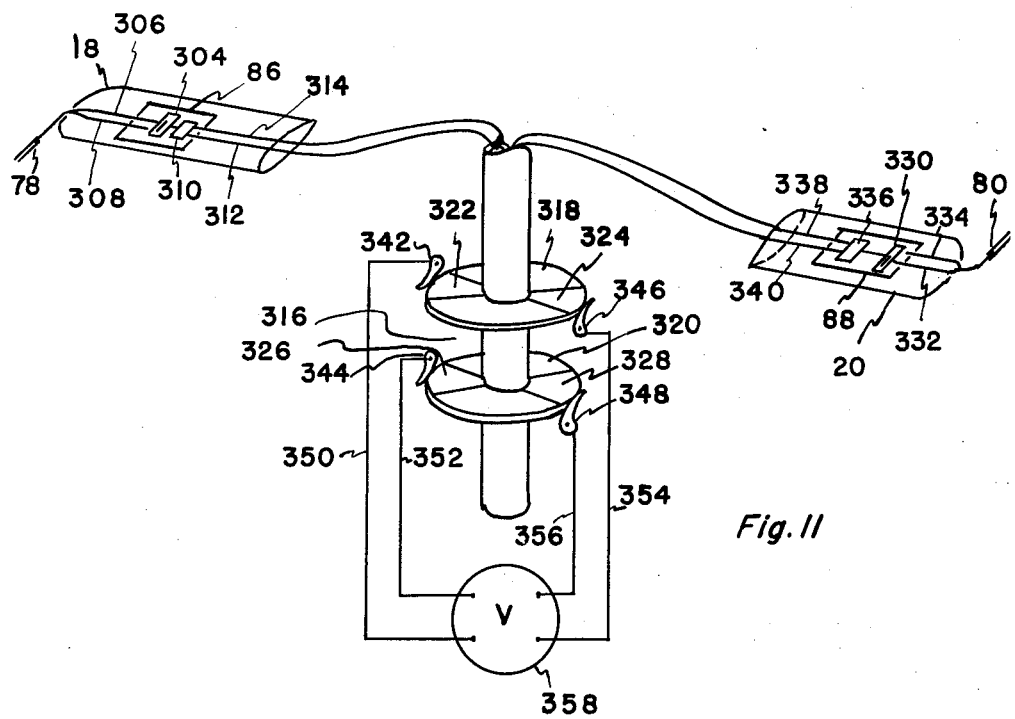
FIGS. 11 and 12 are schematic views of modified forms of sensors, rotor hubs, contactors, and gauges constructed according to the teachings of the invention.

Another preferred embodiment of the invention is shown in FIG. 11, wherein a Pitot-static sensor 78 mounted on a rotor blade 18 transmits the dynamic pressure resulting from its relative airspeed and the static pressure prevailing at its location continuously to a gauge 86 also mounted on rotor blade 18. The gauge 86 consists of a diaphragm mechanism 304 which expands to a degree proportional to the difference between the dynamic and static pressures conveyed to gauge 86 from sensor 78 by means of tubes 306 and 308, respectively, and a conventional transducer 310, comprising a piezoelectric crystal or other means well known in the art of transforming pressure differences into electrical signals at a rate proportional to the square root of the pressure difference, that is, proportional to the airspeed sensed by the Pitot-static sensor 78. The output of transducer 310 is transmitted through a transmission line consisting of leads 312 and 314 which terminate in commutator assembly generally designated 316 consisting of two commutator rings 318 and 320, wherein commutator ring 318 comprises conductive sections 322 and 324, and wherein commutator ring 320 comprises conductive sections 326 and 328, said commutator assembly 316 being rigidly affixed to the rotor hub 21 and rotating therewith. Lead 312 is electrically connected to sector 322 on commutator ring 318 and lead 314 is electrically connected to sector 326 on commutator ring 320.

On another rotor blade 20, a sensor 80 transmits the dynamic pressure resulting from its relative airspeed and the static pressure prevailing at its location continuously to a gauge 88 also mounted on rotor blade 20. The gauge 88 consists of a diaphragm mechanism 330 which expands to a degree proportional to the difference between the dynamic and the static pressure conveyed to gauge 88 from sensor 80 by means of tubes 332 and 334, respectively, and a transducer 336; the output of transducer 336 is transmitted through a transmission line consisting of leads 338 and 340 which terminate in commutator assembly 316. Lead 338 is electrically connected to conductive sector 324 on commutator ring 318 and lead 340 is electrically connected to conductive sector 328 on commutator ring 320. Brushes 342 and 344, which are rigidly affixed to the fuselage and placed in the fuselage plane perpendicular to which the air velocity component is to be measured, will receive and transmit the transducer signal whenever rotor blade 18 passes through the fuselage reference plane in which brushes 342 and 344 lie, at which time electrical contact is established between commutator sector 322 and brush 342 and between commutator sector 326 and brush 344, respectively. Located within the same fuselage reference plane, but diametrically opposed to brushes 342 and 344 are brushes 346 and 348 which are also rigidly affixed to the fuselage. When rotor blade 20 passes through the said fuselage reference plane in which brushes 346 and 348 lie, electrical contact is established between commutator selector 324 and brush 346 and between commutator sector 328 and brush 348. Electrical connections exist between brush 324 and lead 350, between brush 344 and lead 352, between brush 346 and lead 354, and between brush 348 and lead 356. Leads 350, 352, 354, and 356 are electrically connected to a differential voltmeter 358 which, by means well known in the art, measures the algebraic sum, that is, in this instance, the arithmetic difference between the voltages then prevailing between leads 350 and 352 and between leads 354 and 356, respectively. The dial of the voltmeter 358 is graduated in units of airspeed. In this embodiment of the invention, the "sensors" are constituted by the Pitot-static probes 78 and 80, which sensors in alternate embodiments of the invention may also consist of other types of dynamic-pressure or airspeed probes, including hot-wire anemometer probes or ion-impingement probes; the "gauges" 86 and 88 comprise diaphragm-type mechanism 304 and 330 in combination with transducers 310 and 336 or other means well known in the art of translating local airspeed measurements into transmittable electrical signals; the "contactors" consist of rotating, commutator-type segmented slip-rings 318 and 320 and stationary brushes 342, 344, 346, and 348; and the "computer" consists of differential voltmeter 358 or other differential, signal-comparing instrument capable of providing a means of measuring the algebraic sum of the signals reaching said "computer" intermittently from the "gauges" 86 and 88 at such times when rotor-mounted sensors 78 and 80 transit through the reference plane 60—62 perpendicular to which the air velocity component measurement is to be made.

Figure 12:
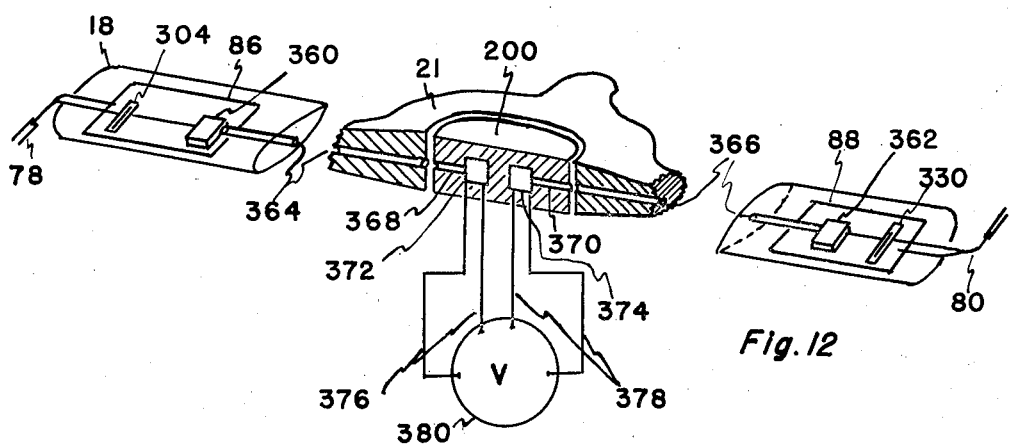

Yet another preferred embodiment of the invention, illustrated in FIG. 12, employs sensors 78 and 80 and gauges 86 and 88 essentially similar to those shown in FIG. 11, wherein transducers 360 and 362 are of a type well known in the art of converting air pressures into a beam of light having a luminous intensity proportionate to the square root of an air pressure and hence directly proportional ot the air speed measured by each of said sensors. The light beam issuing from transducer 360 passes through a conduit 364 contained within rotor blade 18, terminating in hub 21; the light beam issuing from transducer 362 passes through a conduit 366 contained within rotor blade 20, terminating also in hub 21. Stator 200 rigidly affixed to the fuselage contains a bore 368 which is aligned with conduit 364 when blade 18 passes through the reference plane 60—62 perpendicular to which the air velocity component is to be measured; stator 200 also contains a bore 370 which is aligned with conduit 366 when rotor blade 20 passes through the same reference plane in a sense opposite to that of blade 18.

When hub 21 passes through an angular position with respect to stator 200 such that conduit 364 and bore 368 are aligned with one another and the light beam issuing from transducer 360 passes through both conduit 364 and bore 368, the light beam impinges on a photoelectric-cell type gauge 372 which, by means well known in the art, provides an electrical measurement of the intensity of the light beam, and, hence, of the airspeed measured by sensor 78, for example, by issuing a voltage proportional to the airspeed measured. Analogously, when hub 21 passes through an angular position with respect to stator 200 such that conduit 366 and bore 370 are aligned with one another and the light beam issuing from transducer 362 passes through both conduit 366 and bore 370, then the light beam impinges on photoelectric-type gauge 374 which issues a voltage proportional to the airspeed measured by sensor 80. The voltages issuing from gauges 372 and 374 are conducted through leads 376 and 378 to a differential voltmeter 380 which serves as a "computer" by measuring the algebraic sum—in this instance the arithmetic difference—of the voltages issuing from gauges 372 and 374 and, hence, providing a measure of the air velocity component of the rotorcraft perpendicular to reference plane 60—62. It will be readily understood that, in this embodiment of the invention, the combination of hub 21, stator 200, conduits 360 and 364, and bores 368 and 370 constitutes a set of "contactors" in the sense of the present specification of invention, whereby airspeed signals are intermittently transmitted from gauges to computers whenever the sensors pass through a given reference plane.

From the foregoing it will be readily apparent that, when the rotorcraft is hovering motionlessly with respect to the surrounding air, the forward air velocity measured by gauge 44 at sensor 36 will be equal in magnitude and opposite in mathematical sign to the rearward air velocity measured by gauge 46 at sensor 38, so that the algebraic sum computed by computer 68 and indicated on indicator 70 will be zero. When the rotorcraft moves directly forward, the forward airspeed measured by gauge 44 at sensor 36 will have the forward airspeed of the rotor craft arithmetically added to its circumferential air speed due to the angular velocity 12 of the rotor, and the rearward airspeed measured by gauge 46 at sensor 38 will have the forward airspeed arithmetically subtracted from its circumferential speed due to the angular velocity 12 of the rotor 10 about its axis 22. Then the computer 68, when summing the output signals of gauges 44 and 46 algebraically, that is, with the sign "plus" for the forward velocities of sensor 36 and "minus" for the backward velocities of sensor 38, will count the forward airspeed of the rotorcraft twice, and indicator 70 which indicates one-half of the numerical result computed and transmitted by computer 68 will therefore correctly indicate the forward airspeed of the rotorcraft.

It will also be readily apparent that, when the rotorcraft is hovering motionlessly or when the rotorcraft is flying with an air velocity directed forward or backward alone, gauges 48 and 50 will measure air velocities of essentially equal magnitude and mutually opposite sign at the airspeed sensors 32 and 34, respectively, so that the computer 64, which receives the output signals from gauges 48 and 50 and which computes the algebraic sum of said airspeed gauge output signals, will transmit a reading of "zero" to indicator 66. When the rotorcraft moves toward the left, the leftward airspeed measured by gauge 48 at sensor 32 will consist of the arithmetic addition with the sign "minus" of the leftward airspeed of the rotorcraft plus the circumferential speed due to the angular velocity 12 of the rotor, whereas the rightward airspeed measured by gauge 50 at sensor 34 will consist of the arithmetic subtraction of the leftward airspeed of the rotorcraft from the circumferential speed due to the angular velocity 12 of the rotor. When summing up algebraically the output signals of gauges 48 and 50, computer 64 will count the leftward airspeed of the rotorcraft twice, and indicated 66, which indicates one-half of the numerical result computed by computer 64, will therefore correctly indicate the leftward air-speed of the rotorcraft.

It is readily seen that, if the rotorcraft moves diagonally, for example forward and toward the left, the indicator 66 will indicate the forwardly directed longitudinal air velocity only, since the transverse air velocity component impinges at a right angle on sensors 32 and 34 and therefore does not contribute any essential quantity to the algebraic sum of the tangential airspeeds of the sensors as computed by computer 64, and the indicator 70 will indicate the leftwardly directed transverse air velocity component of the rotorcraft only, since the longitudinal air velocity component impinges at a normal angle on sensors 32 and 34 and, therefore, does not contribute materially to the algebraic sum of the tangential airspeeds of the sensors as computed by computer 68. The readings of indicators 66 and 70 may either be presented individually or be combined in a composite reading in a resultant vectorial computer-indicator 72, represented in FIG. 3 by a circle inscribed with the symbol "$I_R$", whereon the direction, sense, and magnitude of the resultant air velocity of the rotorcraft, of which the longitudinal and transverse velocities indicated on indicators 66 and 70 are the components, are shown. It will also be understood that computers 64 and 68 may also, by means well known in the art, integrate the air velocities over a period of time and hence transmit to indicators 66, 70, and 72 signals proportional to the displacement of the rotorcraft with respect to a predesignated initial position, and that indicators 66, 70, and 72 will then indicate such displacements to the pilot.

From the foregoing it will be readily understood that, whereas sensors responsive to the total air velocity directed essentially in a plane perpendicular to the rotor axis 22 will introduce a small error into the measurement performed by the gauges, sensors responsive only to the fluid-velocity component tangential to the circular path or orbit of the sensor will be employed in a preferred embodiment of the invention. It will also be readily seen that the said directions of the air velocity are distinctly different from the direction of an air velocity chordwise with respect to a rotor blade, since in order to produce lift the chord of a rotor blade must form an angle of incidence relative to said plane perpendicular to the axis of rotation 22 of the rotor 10 and hence is distinctly different therefrom.

It is also readily understood that, whereas the position of the rotorcraft elements shown in FIGS. 1, 2, and 3 obtains only for a short angular interval owing to the continued rotation of the rotor 10 in the sense 12, a 90-degree angular advancement of the rotor 10 about its axis 22 brings blade 16 into alignment with plane 60—62, where contactor 52 becomes operative in connecting sensor 34 with gauge 44, and so forth around the rotor, whereupon sensors 32 and 34 transmit airspeed signals relative to the longitudinal airspeeds to gauges 44 and 46 and thence to computer 68 and indicator 70 for determination of the longitudinal component of the relative air velocity of the rotorcraft, and sensors 36 and 38 transmit airspeed signals relative to the transverse airspeeds to gauges 40 and 42 and thence to computer 64 and indicator 66 for determination of the transverse component of the relative air velocity of the rotorcraft.

The process of measurement, computation, and indication will be repeated as many times for each rotation of the rotor 10 about its axis 22 as there are blades on the rotor, that is, twice for a two-bladed rotor, four times for a four-bladed rotor, and so forth.

In an air velocity measuring instrumentation system constructed in accordance with a preferred embodiment of this invention, the airspeed gauges 40, 42, 44, and 46 are so equipped with means well known in the art that they do not return to zero after obtaining the measurement of an airspeed signal received from one of the respective blade-mounted sensors 32, 34, 36, and 38, but they remain at their last precedent reading until a new measurement is provided by the transit of the next blade-mounted sensor through the respective reference plane 56—58 or 60—62, so that the algebraic sums computed by computers 64 and 68, and indicated by indicators 66 and 70 do not return to zero between blade transits through the said reference planes. Also, should a single blade-mounted sensor or a sensor-to-gauge contactor fail momentarily in operation, this "retained-reading" arrangement would avert large-scale oscillations of the computers and indicators.

It will be readily understood that gauges, computers, and indicators may be combined in single physical devices, wherein each component is a functional element of the combined device.

FIG. 4 illustrates an alternate embodiment of the air velocity measuring system constructed in accordance with the invention, wherein airspeed sensors 74, 76, 78 and 80 are mounted on the same rotor blades with gauges 82, 84, 86, and 88, respectively, and contactors 90, 92, 94, and 96 connect said gauges with fuselage-mounted computers 98 and 102 and thence with indicators 100 and 104, respectively, during the transit of the blade-mounted sensors and gauges through the reference planes 106—108 and 110—112. This arangement has advantages, for example when it is desired to adjust the directional orientation of the system of contactors 90, 92, 94, and 96 about the rotor axis 22 in such a manner that one pair of contactors, 90 and 92, be oriented in the direction in which the airspeed is zero, whereupon the other pair of contactors, 94 and 96, placed at a right angle to said one pair of contactors, 90 and 92, will lie in that plane in which the total resultant essentially horizontal air velocity of the rotorcraft is directed.

Figure 5:
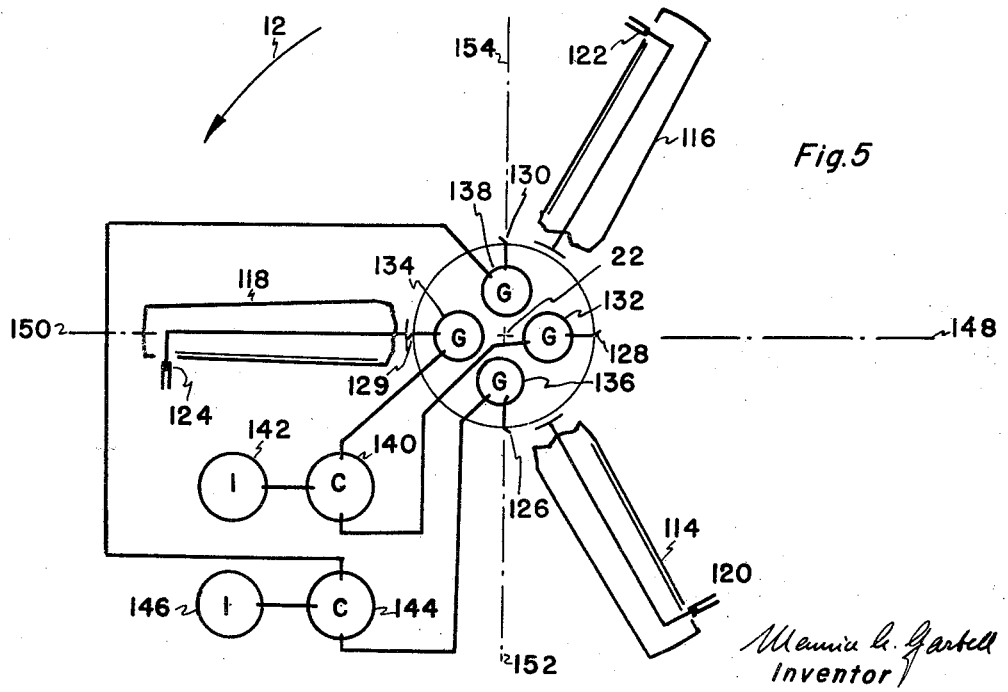

FIG. 5 illustrates an air velocity measuring instrumentation system construtced in accordance with the invention as installed in a rotorcraft equipped with a rotor having three blades, wherein airspeed sensors 120, 122, and 124 are mounted on rotor blades 114, 116, and 118, respectively. It will be readily seen that, with reference to the time instant portrayed in FIG. 5 and with due consideration to the sense of rotation 12 of the rotor 10 about its axis 22, airspeed gauge 136 has a short time ago received an airspeed signal from sensor 120 through contactor 126 and retained a measurement of said airspeed signal, when blade 114 transited through the transverse reference plane 152—154, and gauge 138 has a short time prior thereto received and retained an airspeed signal from airspeed sensor 124 through contactor 130, when blade 118 transited through the same reference plane 152—154, and that computer 144 will, upon performing the algebraic summation of the airspeed gauge output signals retained by gauges 136 and 138 are dividing the numerical result by two, convey the magnitude and sense of the longitudinal air velocity of the rotorcraft to indicator 146. Similarly computer 140 will convey to indicator 142 the magnitude and sense of the transverse component of the air velocity of the rotorcraft as obtained from its algebraic summation of the output signal of airspeed gauge 132, derived from the airspeed signal of sensor 122 via contactor 128 when rotor blade 116 last transited through the longiutdinal reference plane 148—150, and the present output signal of gauge 134 from sensor 124 mounted on blade 118 via contactor 129.

Whereas, in a rotorcraft equipped with an odd number of blades, the airspeed measurements made by the blade-mounted sensors transiting through a designated reference plane on opposite sides of the rotor axis 22 will not be strictly simultaneous, it will be remembered that the rotor 10 makes several complete revolutions per second, so that any time difference between the aforesdescribed measurements will be of an order of magnitude between 1/10 and 1/100 of a second and, hence, the measurements will be virtually simultaneous, so far as practical changes in airspeed of the rotorcraft are concerned. It will be readily understood that the utilization of "memory-type" gauges, which retain an output signal from the receipt of one sensor-produced airspeed signal to the next is an essential element in the functioning of this embodiment of the invention.

FIG. 6 illustrates another embodiment of the invention, wherein an airspeed sensor 156 is mounted on rotor blade 158 and is continually transmitting its airspeed signals to an airspeed gauge 160, while an angle-measuring device 162, which may be physically part of said gauge and which is actuated by the rotation of the rotor 10, obtains a measure of the angle "alpha" formed between a radius line, fixed relative to the blade 158 on which sensor 156 is mounted, and an established horizontal reference direction 162—164 on the plane of rotation of the rotor, for example the horizontal forward direction of the vertical longitudinal plane of symmetry of the rotorcraft body 24. The gauge 160 and the angle-measuring device 162 combined therewith transmit their output signals relative to sensor airspeed and angle "alpha" to an integrator 166 which computes the quantity

[(airspeed) times (cosine function of alpha)]

and the quantity

[(airspeed) times (sine function of alpha)]

for example by means of a sine-cosine type potentiometer circuit, and integrates or sums up each of the two quantities in brackets algebraically over a full 360-degree revolution of the sensor-carrying blade about the rotor axis 22. At the end of each full revolution the integrator 166 transmits the integrated quantity

[(airspeed) times (cosine alpha) times (a constant)]

to an indicator 168 which indicates it as the mean component of the air velocity of the rotorcraft along the established reference plane 164—167 and simultaneously transmits the integrated quantity

[(airspeed) times (sine alpha) times (a constant)]

to an indicator 170 which indicates it as the mean air velocity component of the rotorcraft perpendicular to said plane. It is readily understood that such an air velocity measuring system can be installed on each of the several blades of a rotor, so that, for each revolution of the rotor, the air velocity components parallel to and perpendicular to the predesignated reference plane will be read as many times as there are blades on the rotor.

FIGS. 7 and 8 illustrate another embodiment of the invention, wherein a waterborne rotorcraft 190 is equipped with sensors 172, 174, 176, and 177 mounted on rotor blades 178, 180, 182, and 184, respectively, where the rotor blades are mounted on a rotor disk 186, rotating about an axis 188 fixed in the hull of said rotorcraft 190, and where said rotor blades are mounted with their major blade dimension essentially parallel to the rotor axis 188 instead of radially as exemplified in the structures illustrated in FIGS. 1 through 6. Aside from this difference in blade geometry, the combination of contactors, gauges, computers, and indicators responding to the sensor signals for the measurement of longitudinal and transverse water velocities and of the vectorial sum or resultant water velocity of the rotorcraft 190 is analogous to those illustrated in FIGS. 1 through 6 in the instance of radial rotor blades. It is readily understood that a water velocity measuring system, as well as an air velocity measuring system constructed in accordance with the invention is equally applicable to rotorcraft equipped with a rotor rotating about a horizontal or sloping axis.

While several forms of the invention have been illustrated and described herein, it will be readily understood by those skilled in the art that variations or modifications may be resorted to without departing from the spirit of the invention. Reference will therefore be had to the appended claims for a definition of the limits of the invention.

It is claimed:

1. In a rotorcraft equipped with a body having a predesignated major longitudinal axis and with a rotor rotating about a rotational axis essentially fixed on said body and fitted with revolving rotor blades, means for measuring and indicating the magnitude of the velocity of said body relative to its surrounding fluid comprising a sensor mounted on each of said blades and spaced from said rotational axis, each of said sensors deriving a signal proportional to a fluid velocity directed essentially in a plane perpendicular to said rotational axis, means for transmitting fluid velocity signals proportional to the full magnitude of the said signals derived by each of said sensors when the latter pass through a reference position, a gauge for each sensor for measuring the full magnitude of the fluid velocity signals transmitted by each sensor and for deriving therefrom signals linearly proportional to the magnitude of the fluid velocity signals, a computer responsive to the algebraic sum of the derived signals measured substantially simultaneously by at least two of said gauges in response to fluid velocity signals transmitted by sensors oppositely disposed to one another with respect to said rotational axis for deriving a resultant signal proportional to the magnitude of the velocity of said body relative to its surrounding fluid, and means for indicating said resultant signal.

2. The combination set forth in claim 1, wherein said sensors are located in the vicinity of the outer tips of said revolving rotor blades.

3. The combination set forth in claim 1, wherein said sensors are responsive essentially to a fluid-velocity component oriented tangentially relative to the circular path described by said sensors in their revolution about said rotational axis.

4. The combination set forth in claim 1, wherein the means for transmitting fluid velocity signals from said sensors to said gauges and thence to said computer include a contactor actuated by the rotation of said rotor and made operative when said rotor blade transits through a limited range of positions with respect to said reference position, and made inoperative for all other blade positions.

5. The combination set forth in claim 4, wherein said gauge is of a type capable of retaining a fluid velocity measurement obtained from a fluid velocity signal received during one transit of a revolving rotor blade through said limited range of positions until a new fluid velocity signal is received and measured by said meter during a subsequent transit of a rotor blade equipped with a sensor through the same limited range of positions.

6. The combination set forth in claim 1, wherein the means for transmitting fluid velocity signals from a sensor to a gauge and thence to a computer include two contactors actuated by the rotation of said rotor, one of said contactors being made operative relative to a gauge and a computer when said rotor blade transits through a limited range of positions adjacent to a first predesignated reference plane fixed with respect to said body and containing said rotational axis, and made inoperative for all other blade positions, and another contactor being made operative relative to a gauge and the same computer when said rotor blade transits through a limited range of positions adjacent to another predesignated reference plane fixed with respect to said body and containing said rotational axis and forming an angle of essentially 180 degrees with respect to said first reference plane, and made inoperative for all other blade positions.

7. The combination set forth in claim 6, wherein said first and said other reference planes essentially contain said longitudinal axis of said body, and wherein said two limited ranges of blade positions adjacent to said two reference planes are one in front and the other aft of said rotational axis.

8. The combination set forth in claim 6, wherein said first and said other reference planes are essentially perpendicular to said longitudinal axis of said body, and wherein said two limited ranges of blade positions adjacent to said two reference planes are one on the right side and the other on the left side of said rotational axis as seen from a point of said longitudinal axis of the body.

9. The combination set forth in claim 1, wherein the means for transmitting fluid velocity signals from a sensor to a gauge and thence to a computer include two contactors actuated by the rotation of said rotor, one of said contactors being made operative relative to a gauge and a computer when said rotor blade transits through a limited range of positions adjacent to a predesignated first reference plane fixed with respect to said body and containing said rotational axis, and made inoperative for all other blade positions, and another contactor being made operative relative to another gauge and another computer when said rotor blade transits through a limited range of positions adjacent to another predesignated reference plane fixed with respect to said body and containing said rotational axis and forming a predesignated angle with respect to said first reference plane, and made inoperative for all other blade positions.

10. The combination set forth in claim 9, wherein the said predesignated angle of the said one predesignated reference plane relative to the said other predesignated reference plane is ninety degrees.

11. The combination set forth in claim 10, wherein the said two predesignated reference planes comprise said rotational axis and wherein the said one reference plane essentially contains said longitudinal axis of the body and the said other reference plane is disposed at essentially a perpendicular angle to said longitudinal axis of the body.

12. The combination set forth in claim 10, wherein the said two predesignated reference planes comprise said rotational axis and wherein the said one reference plane is directed essentially along the direction of zero velocity of the rotorcraft and the said other reference plane is disposed essentially along the direction of the resultant velocity of the rotorcraft, and where means are provided to orient said contactors in the said two directions.

13. The combination set forth in claim 10, wherein said two computers are further equipped and connected with a vectorial computer-indicator effecting the vectorial sum of the fluid velocities measured by the gauges and computed by said two computers and an indicator providing a reading of the magnitude and direction of said vectorial resultant sum.

14. The combination set forth in claim 1, wherein said gauge comprises an angle-measuring device actuated by said rotor that measures continually, in a plane perpendicular to said rotational axis, the angle formed between a predesignated radial line parallel to said perpendicular plane and fixed relative to said rotating rotor and a predesignated reference plane fixed relative to said body and containing said rotational axis, and wherein said computer comprises an integrator providing the mathematical product of a fluid-speed measurement made by said sensor and gauge at any value of said angle times a trigonometric function of said angle and integrating said product over a predesignated range of values of said angle, and wherein said indicator provides an indication of said integrated product times a predesignated constant quantity.

15. The combination set forth in claim 14, wherein said predesignated reference plane essentially comprises the said rotational axis of the rotor and said longitudinal axis of the body.

16. The combination set forth in claim 14, wherein said predesignated reference plane essentially comprises the said rotational axis of the rotor and is essentially perpendicular to said longitudinal axis of the body.

17. The combination set forth in claim 14, wherein said trigonometric function is the sine function of said angle.

18. The combination set forth in claim 14, wherein said trigonometric function is the cosine function of said angle.

19. The combination set forth in claim 14, wherein said predesignated range of values of said angle comprises essentially 360 degrees.

20. The combination set forth in claim 14, in which the integrator is equipped with a time integrator which provides the mathematical product of the fluid velocity computed by said computer times the quantity "time," and wherein said indicator is equipped to provide an indication of said mathematical product times a predesignated constant quantity.

21. The combination set forth in claim 1, wherein said gauge comprises an angle-measuring device actuated by said rotor that measures continually, in a plane perpendicular to said rotational axis, the angle formed between a predesignated radial line parallel to said perpendicular plane and fixed relative to said rotating rotor and a predesignated reference plane fixed relative to said body and containing said rotational axis, and wherein said computer comprises an integrator providing the mathematical product of a fluid-speed measurement made by said sensor and gauge at any value of said angle times the trigonometric sine function of said angle and simultaneously providing the mathematical product of the fluid-speed measurement made by said sensor and gauge at the same value of said angle times the trigonometric cosine function of said angle and integrating said mathematical products separately over a predesignated range of values of said angle, and wherein said integrator includes a vectorial computer which adds said two integrated mathematical products vectorially and transmits the results of the vectorial addition to an indicator which provides an indication of the vectorial sum resulting from said vectorial addition times a predesignated constant quantity.

22. The combination set forth in claim 1, in which the computer is equipped with a time integrator which provides the mathematical product of the fluid velocity computed by said computer times the quantity "time," and wherein said indicator is equipped to provide an indication of said mathematical product times a predesignated constant quantity.

References Cited in the file of this patent

UNITED STATES PATENTS

| | | |
|---|---|---|
| 2,524,747 | Ayres | Oct. 10, 1950 |
| 2,531,521 | Link | Nov. 28, 1950 |
| 2,624,531 | Stalker | Jan. 6, 1953 |
| 2,779,193 | Lee | Jan. 29, 1957 |
| 2,844,960 | Staros | July 29, 1958 |
| 2,846,878 | Carbonara | Aug. 12, 1958 |
| 2,952,154 | Traksel | Sept. 13, 1960 |

FOREIGN PATENTS

| | | |
|---|---|---|
| 757,282 | Great Britain | Sept. 19, 1956 |